United States Patent [19]
Markovitz et al.

[11] Patent Number: 5,350,815
[45] Date of Patent: Sep. 27, 1994

[54] COPPER BONDING EPOXY RESIN COMPOSITIONS, RESIN COATED COPPER ARTICLES AND METHOD

[75] Inventors: Mark Markovitz, Schenectady; William E. Tomak, Scotia, both of N.Y.

[73] Assignee: General Electric Company, Schenectady, N.Y.

[21] Appl. No.: 66,320

[22] Filed: May 21, 1993

Related U.S. Application Data

[63] Continuation of Ser. No. 683,289, Apr. 10, 1991, abandoned.

[51] Int. Cl.$^5$ .............................................. C08L 63/00
[52] U.S. Cl. .................................... 525/533; 525/529; 525/530; 428/418; 528/111.3
[58] Field of Search ................ 525/533, 529, 530; 428/418; 528/111.3

[56] References Cited

U.S. PATENT DOCUMENTS

| 3,219,602 | 11/1965 | Scheibli | 528/111.3 |
| 3,812,214 | 5/1974 | Markovitz | 260/830 |
| 4,017,432 | 4/1977 | Carey | 528/111.3 |
| 4,486,558 | 12/1984 | Guilbert | 525/908 |
| 4,603,182 | 7/1986 | Markovitz | 428/364 |
| 4,661,562 | 4/1987 | Goel | 528/111.3 |
| 4,792,479 | 12/1988 | Marchetti et al. | 428/414 |

OTHER PUBLICATIONS

Handbook of Epoxy Resins, Leet Neville (pp. 11–13) Mar. 21, 1967.
Handbook of Epoxy Resins, Lee & Neville, pp. 11–21 and 11–22 McGraw Hill Book Co. 1967.
Bulletin No. 438-B-Emery Inds Inc. (Henkel Corp)—Jan. 1968.

Primary Examiner—Melvyn I. Marquis
Assistant Examiner—Randy Gulakowski
Attorney, Agent, or Firm—Charles T. Watts; James E. McGinness

[57] ABSTRACT

A bare copper conductor is provided with a tenaciously adhering epoxy resin by heating and curing in situ on the conductor a coating of a solution of cycloaliphatic epoxy resin, a hardener, stannous octoate as a catalyst, and a phenolic accelerator.

10 Claims, 1 Drawing Sheet

COPPER BONDING EPOXY RESIN COMPOSITIONS, RESIN COATED COPPER ARTICLES AND METHOD

This application is a continuation of application Ser. No. 07/683,289, filed Apr. 10, 1991, now abandoned.

FIELD OF THE INVENTION

This invention relates generally to the art of adhesive bonding, and is more particularly concerned with novel cycloaliphatic epoxy resin compositions having special utility in producing tenaciously adhering coatings on copper surfaces, and with new epoxy resin coated copper articles and the method of producing them.

BACKGROUND OF THE INVENTION

It has long been generally recognized in the art that copper and copper alloys present a bonding problem because of the rapid oxidation of copper which results in a weak copper oxide surface. The establishment of satisfactory bonds is particularly difficult if high shear and high peel strengths are required. The problem attends in the production of components of electrical apparatus such as connection rings in which resin materials are used to bond copper strands and to solidify the structure. In the case of terminal studs of collector assemblies, hydrogen leak problems are a consequence of poor bonding of insulation to copper surfaces.

A number and variety of different methods have been devised by others heretofore in efforts to overcome or alleviate the copper bonding problem, but they all involve significant disadvantages. For one thing, they share a critical time requirement complicating work flow in production because of the necessity for applying the resin coating immediately on completion of copper substrate surface preparation. Further, those processes—specifically, the ammonium persulphate process, the ferric chloride process, the hydrochloric acid-ferric chloride process, the sodium dichromate-sulphuric acid process and the so called "black oxide" process—involve the use of highly corrosive and dangerous materials and consequently require special care in compliance with governmental safety, health and environmental protection laws and regulations.

SUMMARY OF THE INVENTION

In accordance with the present invention, based on our discoveries and novel concepts set out below, tightly adherent resin coatings can consistently be provided on oil film-free copper surfaces. Thus, a secure resin-metal bond is produced without the heretofore essential preliminary step of removing oxide from the metal surface and without the use of any corrosive or dangerous material. Further unlike the prior art practices, the method of this invention does not involve a critical time factor. Moreover, this new method does not require protracted cure times at elevated temperatures. Finally, all these new results and advantages are to be gained without incurring any significant offsetting disadvantage.

One of our discoveries upon which this invention is based is that certain cycloaliphatic epoxy resins used in combination with a dimer acid or a trimer acid or equivalent hardener, stannous octoate or curing catalyst and with optional additional phenolic accelerator have the ability to bond to copper surfaces with excellent adhesion. Another finding of ours is that this unique result can be obtained without specially preparing the surface of the copper body preliminary to applying the resin mixture thereto, other than to remove any oil film that may be on the surface of the "as received" copper body. Thus, copper which is oil film free, can be coated directly with the resin mixture which is cured in situ to provide the excellent adhesion of the resin to the substrate.

We have further found that cycloaliphatic epoxy resins must have two epoxy groups per molecule and must be used in the proportion of 35 to 65 parts to 65 to 35 parts of hardener for consistently gaining the best results in the practice of this invention. Additionally, such formulations of equal parts of the epoxy resin and the hardener are especially desirable for our purposes.

We have also found that blends of cycloaliphatic epoxy resins with glycidyl ether epoxy resins and glycidyl ester epoxy resins may be used to gain the new results and advantages of this invention. Such blends, however, should contain at least 50% of the cycloaliphatic epoxy resin and the other epoxy resin or resins of the blend should have at least two epoxy groups per molecule.

The thermosetting resin compositions of this invention incorporate a small but effective amount of a catalyst such as one or two parts per 100 parts of the aggregate of the epoxy resin and hardener mixture. The catalyst is stannous octoate and the accelerator may be one or another of phenolic compounds or phenolic resins identified below, several which may be used singly or together to the extent that they are compatible in admixture with each other and the epoxy resin the hardener and the stannous octoate catalyst. In the preferred practice we use only about one part stannous octoate and only about one half part catechol accelerator to 100 parts of the aggregate of epoxy resin and hardener.

The utility of cycloaliphatic epoxy resins for this purpose has not been previously known or recognized and, in fact, such use of them is not disclosed in the prior art. The method of putting them to such use and the resulting articles are consequently both new and based upon the foregoing discoveries. The novel method concept of ours, briefly stated, comprises the steps of providing a body having an oil film-free copper surface, preparing a mixture of about equal proportions of cycloaliphatic epoxy resin and hardener for said resin plus a small but effective amount of a catalyst and an accelerator, coating the oil film-free copper surface portion of the body with the resulting resin solution, and finally heating the body and curing the resin coating in situ thereon.

This general process concept has variations which include the preliminary step of removing any oil film present on the "as received" copper surface to receive the resin solution coating, and also the step of heating of the resin coating on the copper surface only long enough and at a high enough temperature to produce the excellent adhesion result desired. Preferably, curing at 150° C. for fifteen minutes will be sufficient, but the heating may be prolonged for an hour or more as desired. Lower cure temperatures such as 100 C. may also be used. Another concept of ours involves increasing the reactivity of the adhesive material of this invention by first mixing the accelerator, suitably catechol, with the resin and producing a solution by stirring it at 110° C., then cooling to room temperature and adding the hardener containing the catalyst. Although four components are present, these can easily be used in a manufacturing environment as a stable, two component system: the epoxy resin containing the phenolic accelerator and the hardener containing the stannous octoate catalyst.

Another concept of ours, broadly described, is an article of manufacture in the form of a body having a copper surface and a tightly-adhering coating of the thermosetting composition of this invention thereon. The resin coating may be of thickness desired and the article may be simply an elongated electrical conductor, or a component of an electrical machine, or any other copper body or substrate body having a surface of copper or copper alloy the use of which requires a protective or insulating coating of resinous material. Since no solvents or other volatile components are present in our compositions, no restrictions on film thickness to be capable of removing volatiles apply to our compositions.

DETAILED DESCRIPTION OF THE INVENTION

Figure 3:
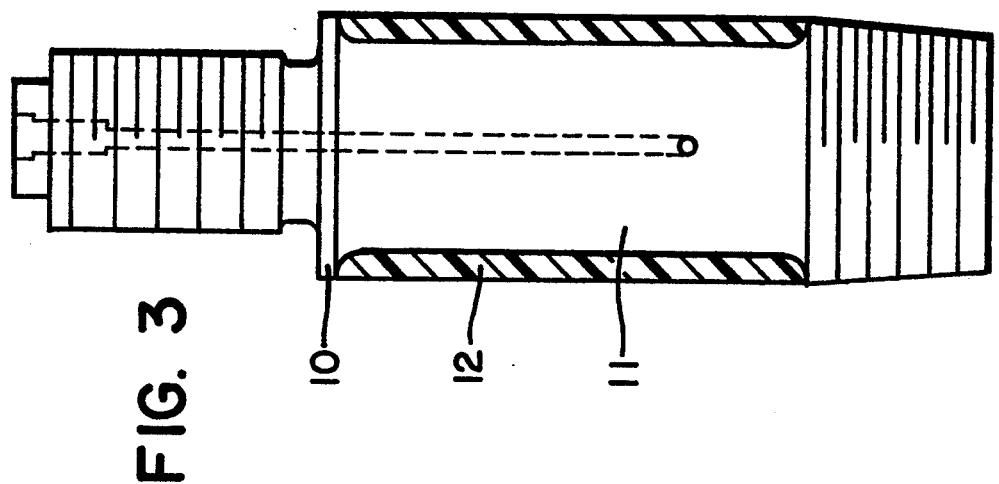

As indicated above, only certain epoxy resin materials are contemplated for use in accordance with this invention, others being incapable of providing the new results and advantages detailed in this description. Thus, in accordance with our present preferred practice, the epoxy resin of choice is the cycloaliphatic epoxy resin 3,4-epoxy cyclohexyl methyl-(3,4-epoxy) cyclohexane carboxylate (sold under the trademark ERL-4221 by Union Carbide Corporation). Other cycloaliphatic epoxy resins may, however, be used in accordance with this invention such as vinyl cyclohexene dioxide (sold under the trademark ERL-4206 by Union Carbide Corporation); 2-(3,4-epoxy cyclohexyl-5,5-spiro-3,4-epoxy) cyclohexane-metadioxane (sold under the trademark ERL-4234 by Union Carbide Corporation); and bis(3,4-epoxycyclohexyl) adipate (sold under the trademark ERL-4299 by Union Carbide Corporation). Additional alternatives which may be used singly or in admixture with each other and those above include blends of the cycloaliphatic epoxy resins with other epoxy resins such as diglycidyl ethers of bisphenol A, bisphenol F, resorcinol and other diglycidyl ether epoxy resins; epoxy novolac resins based on phenol or cresol novolacs; and diglycidyl ester epoxy resins. When blends of epoxy resins are used, the cycloaliphatic epoxy resin will be 50% or higher of the blend.

As stated above, we prefer to use a dimer acid or a trimer acid, or a mixture thereof, as the hardener for the epoxy resin in the practice of this invention. These compounds are dimerized and trimerized fatty acids formed by the polymerization of unsaturated fatty acids. The preparation and composition of the dimer and trimer acids are known to those skilled in the art and are described in the Handbook of Epoxy Resins, Lee and Neville, pp. 11-21 and 11-22 (McGraw Hill 1967).

Other hardeners include polycarboxylic acids and carboxyl terminated polyester resins containing two or more carboxyl groups per molecule.

While other catalysts for curing epoxy resins are known to the art and might be used here, our choice is stannous octoate which holds substantial advantages over alternatives in this particular application.

Also as stated above, our preference in the practice of this invention at the present time is the use of catechol as the accelerator. Again, however, the operator has a number of choices in this regard including other phenolic compounds such as resorcinol, bisphenol A, phenol novolacs, phenol resoles, hydroquinone, salicylaldehyde, cresols, nitrophenols and various other phenolic compounds and resins known to those skilled in the art for this general purpose.

Those skilled in the art will gain a further and better understanding of the present invention and the new results and advantages thereof from the following illustrative, but not limiting, examples of the practice of this invention as it has actually been carried out experimentally.

Rectangular copper wire (0.35 inch wide, 0.090 inch thick) was used as a substrate to test the previously used adhesive (as a control), to test variations of the previously used adhesive, to evaluate surface treatments on the copper and to test new adhesives. The adhesive was coated on the rectangular copper wire in each instance and then baked to cure the adhesive. The coated wire was cooled to room temperature and then bent around a 0.50 inch-diameter mandrel. Since the epoxy adhesives are hard glassy solids, the epoxy resins on the copper cracked when the wire was bent. If the adhesive flaked off the copper in addition to cracking when the wire was bent, the adhesive was considered to have failed the adhesion test. If the adhesive cracked when the wire was bent around the mandrel but remained bonded to the copper, the adhesive was considered to have passed this adhesion test.

EXAMPLE 1

An adhesive based on 50.0 parts-by-weight (pbw) of a bisphenol A diglycidyl ether epoxy resin (epoxide equivalent weight 185-192, viscosity at 25 C. 11,000-15,000 centipoises, Epon 828, Shell Chemical Co.) and 50.0 pbw of methyl tetrahydrophthalic anhydride containing an imidazole accelerator was coated on copper wire that was cleaned with toluene, acetone and then dried. The coated wire was cured 15 minutes at 150 C. The adhesive failed the adhesion test.

All of the following changes made to improve the adhesion to copper using this adhesive composition failed to improve the adhesion to copper:

a) changing the ratio of epoxy resin to imidazole accelerated methyl tetrahydrophathalic anhydride from 50.0:50.0 to 50.0:35.0, 50.0:42.5, 50.0:57.5 and 50.0:73.0, b) reducing the cure temperature from 150 C. to 120 C. and increasing the cure time at 120 C., c) increasing the cure time at 150 C. from 15 minutes to up to 5.0 hours, d) cleaning the copper wire with acetone, xylene, toluene, 1,1,1,-trichloroethane or treating with 10% phosphoric acid in water, e) adding water to the acid anhydride hardener, f) adding 0.25% of Fluorad FC 430 (3M Co.) nonionic fluorochemical surfactant to the adhesive to reduce the surface tension and improve its wetting properties, g) adding 7.5% of a high molecular weight polymer, and h) adding 1.0% of three different organometallic adhesion promoters as recommended by the manufacturer.

EXAMPLE 2

Adhesives based on bisphenol A diglycidyl ether epoxy resin Epon 828 and the following curing agents failed the copper adhesion test:

a) tetrabutyl titanate accelerated with 2-ethyl-4-methylimidazole, b) tetrabutyl titanate accelerated with N,N-dimethylbenzylamine, c) dicyandiamide and accelerated dicyandiamide hardeners, and d) 2-ethyl-4-methylimidazole.

In all cases the copper was cleaned with xylene and then acetone before applying the adhesive.

EXAMPLE 3

A solventless, clear resin was made from 45.0 pbw of cycloaliphatic epoxy resin ERL 4221 (3,4-epoxycyclohexylmethyl-3,4-epoxy-cyclohexame carboxylate, epoxide equivalent weight 131-143, viscosity 350–450 cps at 25 C., Union Carbide Corp.), 50.0 pbw of dimer acid Empol 1014 (2 carboxyl groups, 36 carbon atoms, approx. molecular weight 565, approx. equivalent weight 283, Henkel Corp.) and 1.0 pbw of stannous octoate. The adhesive was cured 1.0 hour at 150 C. to obtain excellent adhesion to copper. The copper was cleaned by wiping with xylene and then acetone.

The adhesion test was repeated with "as received" copper without wiping with solvents. Excellent adhesion again resulted after curing the adhesive 1.0 hour at 150 C.

EXAMPLE 4

Adhesives were made using 45.0 pbw of ERL 4221 epoxy resin, 50.0 pbw of dimer acid, and 2.0 pbw of stannous octoate or 50.0 pbw of Empol 1041 trimer acid and 1.0 or 2.0 pbw of stannous octoate. Empol 1041 trimer acid contains three carboxyl groups per molecule, 54 carbon atoms, molecular weight approx. 850 and equivalent weight of 283 (Henkel Corp.). Excellent adhesion to "as received" copper resulted after a 15 minutes cure at 150 C.

EXAMPLE 5

Significant reactivity increases of the adhesives described in Examples 3 and 4 resulted by accelerating the cure with catechol dissolved in the ERL 4221 epoxy resin. The resins described in Examples 3 and 4 were still a liquid after coating on copper and baking 3.0 minutes in a 150 C. oven.

Catechol (0.45 pbw) was dissolved in ERL 4221 (45.0 pbw) by heating and stirring at 110 C. After cooling to room temperature, the resin was catalyzed with Empol 1014 dimer acid (50.0 pbw) containing stannous octoate (1.0 pbw). The resin was coated on copper and heated 3.0 minutes in a 150 C. oven. The resin cured to a hard solid with excellent adhesion to copper.

EXAMPLE 6

A solution of 5.0 grams catechol in 500.0 grams ERL 4221 epoxy resin was made by heating and stirring at 110 C. The resin cooled to room temperature to a clear, stable liquid.

A solution of 10.0 grams of stannous octoate in 500.0 grams of Empol 1014 dimer acid was made by stirring at room temperature. This was stable, clear liquid at room temperature.

Resins were made mixing 50.0 pbw of the ERL 4221—catechol resin with 35.0, 40.0, 45.0, 50.0, 55.0, 60.0 and 65.0 pbw of the dimer acid—stannous octoate solution. The resins were coated on "as received" copper. The samples were cured 15.0 minutes at 150 C. resulting in excellent adhesion to copper. Another set of samples made with the same materials showed that cure resulted even after 3.0 minutes at 150 C. with excellent adhesion to the "as received" copper.

It was noted that the compositions described in Examples 3,4,5 and 6 caused the copper to turn to a lighter color where the resins were applied. It is probable that this was caused by the resins reacting with the oxide on the copper surface and may account for the excellent adhesion shown by these compositions. No such bleaching effect was seen on the copper samples made with the resins of Examples 1 and 2 which did not pass the adhesion test.

As shown by these examples, the previously used adhesive (Example 1) and all its variations did not produce the desired result and the adhesion to copper failed in each instance. Likewise as shown by Example 2, resin systems used as high performance epoxy adhesives failed the adhesion to copper test like the resins of Example 1.

On the other hand, as evidenced by Examples 3-6, excellent adhesion was consistently obtained with the novel composition of this invention using either the dimer or the trimer acid, stannous octoate catalyst and the optional catechol as the accelerator for the cure of the resin composition.

Figure 1:
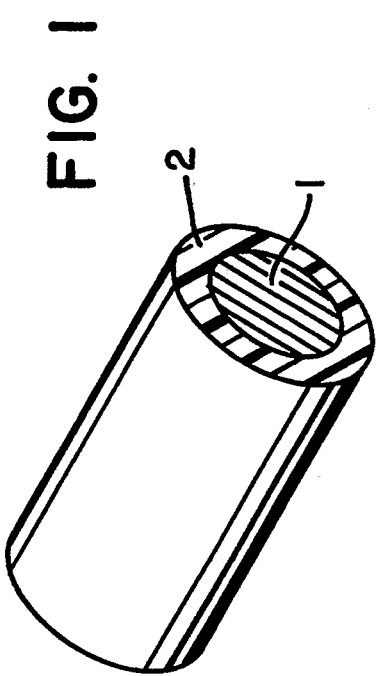
FIG. 1 is a fragmentary perspective view of a copper rod or wire bearing a coating of tightly-adhering epoxy resin produced in accordance with this invention.

As shown in FIG. 1 of the drawings, this invention is useful in providing insulated copper conductors such as wires and bars, a copper wire rod 1 being provided with a coating of the present composition as an insulating cover 2 by applying the coating in liquid form and curing it in situ on the substrate rod or wire by heating the assembly to a moderately high temperature for a rather short time, as described in detail above.

Figure 2:
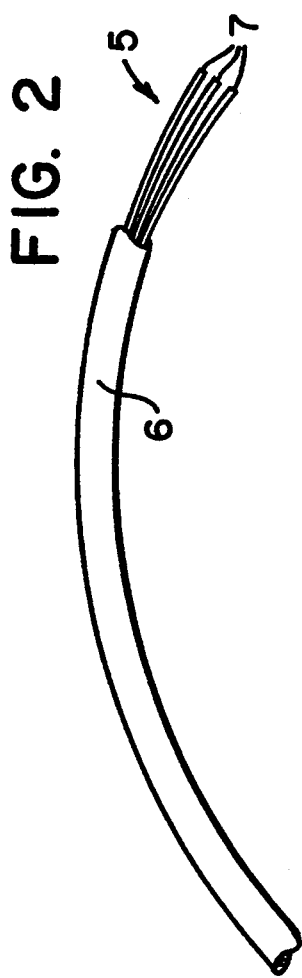
FIG. 2 is a fragmentary view of a connection ring with a portion of the insulating cover broken away to show the copper strands of the ring bound in the structure with the epoxy resin composition of this invention; and, FIG. 3 is a copper terminal stud of a collector assembly, the central body portion of which is covered with a tightly-adhering coating of epoxy resin composition of this invention shown in cross section.

Similarly, the invention is used to provide connection rings as indicated above and as shown in FIG. 2 where ring 5 is overcoated and the composition of this invention applied as described above and cured in situ, the insulating coating 6 permeating the wire bundle of strands 7 comprising the connection ring partially shown in FIG. 2.

In FIG. 3 a terminal stud 10 is shown insulated through its recessed central portion 11 by a coating of insulating material 12, the thermoserring epoxy resin composition of this invention being applied and cured in situ as described above.

Should additional insulation be desired in any such application as just described involving the composition of this invention, it may be provided in the manner desired. For example, a mica paper tape reinforced with glass fibers and preimpregnated with an epoxy resin is applied before or after curing of the composition in contact with the copper service of the substrate. Further, as previously indicated, this invention may be applied to the insulation of bodies of metals or materials other than copper which, however, have surfaces of copper or copper alloys which present the bonding problem solved by this invention.

In the specification and the appended claims where ratios, proportions or percentages are stated, reference is to the weight basis unless expressly stated otherwise.

I claim:

1. An article of manufacture comprising a copper wire covered by a tightly-adhering, electrically-insulating, thermosetting composition coating which is hard, glassy and cracks but does not flake when the wire is bent around a 0.50 inch mandrel, the coverd wire being made by coating the wire with a solventless clear solution of a composition consisting essentially of 35 to 65% of 3,4 epoxy cyclohexylmethyl-(3,4 epoxy) cyclohexane carboxylate resin, 65 to 35% of a hardener for the epoxy resin selected from the group consisting of a dimerized unsaturated fatty acid and a trimerized unsaturated fatty acid and mixtures thereof, and a small but effective amount of stannous octoate catalyst and 0–3% of phenolic accelerator, and curing the said composition by heating the copper wire and the coating thereon.

2. The article of claim 1 in which the thermosetting resin composition contains about 45 parts of the epoxy resin and about 50 parts of the hardener, and about 2.0 parts of stannous octoate.

3. The article of claim 2 in which the hardener is dimerized unsaturated fatty acid.

4. The article of claim 1 in which the resin composition contains about 1% stannous octoate and about ½% catechol.

5. The method of producing an electrically insulated copper wire which comprises the steps of providing a copper body having an oil film-free surface portion, preparing a solventless thermoserring resin composition which is a liquid solution at 25° C. and consists essentially of about 35 to 65% 3,4 epoxy cyclohexylmethyl-(3,4 epoxy) cyclohexane carboxylate resin and about 65 to 35% of a hardener for the epoxy resin selected from the group consisting of a dimerized unsaturated fatty acid and a trimerized unsaturated fatty acid and mixtures thereof and a small but effective amount of stannous octoate catalyst and 0 to 3% of phenolic accelerator, covering the oil film-free surface portion of the copper wire with the liquid resin solution, and finally heating the copper wire and curing the resin covering thereon in situ.

6. The method of claim 5 in which the stannous octoate is in amount of about 2% and the accelerator is catechol in amount of about 1%.

7. The method of claim 5 in which the resin composition contains about equal amounts of the epoxy resin and the hardener, about 1% stannous octoate and about ½% catechol, and in which the resin coated copper body is heated to about 150° C. for about 15 minutes as the curing step.

8. The method of producing an electrically insulated copper wire which comprises the steps of providing an as-received copper wire, preparing a solventless thermosetting resin composition which is a liquid solution at 25° C. and consists essentially of about 35 to 65% 3,4 epoxy cyclohexylmethyl—(3,4 epoxy) cyclohexane carboxylate and about 65 to 35% a hardener for the epoxy resin selected from the group consisting essentially of a dimerized unsaturated fatty and a trimerized unsaturated fatty acid and mixtures thereof and a small but effective amount of stannous octoate catalyst and 0 to 3% of phenolic accelerator, covering the surface of the as-received copper wire with the liquid resin solution, and finally heating the copper wire and curing the resin covering thereon is situ and thereby producing a coating on the wire which is hard, glassy and cracks but does not flake when the wire is bent around a 0.50 inch mandrel.

9. The method of claim 8 including the preliminary step of wiping the as received copper body and thereby removing any oil film therefrom.

10. The method of claim 8 in which the resin composition contains about 45 parts by weight of the epoxy resin, about 50 parts by weight of the hardener, one part by weight of stannous octoate and 0.45 part by weight of catechol, and in which the coated wire heating step is conducted for three minutes at 150° C. to cure the resin to hard solid bonded securely to the wire.

* * * * *